US012606921B2

(12) United States Patent
Zhu et al.

(10) Patent No.: US 12,606,921 B2
(45) Date of Patent: Apr. 21, 2026

(54) CARBON SUPPORTED NITROGEN SURFACE FUNCTIONALIZED SILVER NANOPARTICLES FOR GAS DIFFUSION ELECTRODES

(71) Applicant: GENESEE VALLEY INNOVATIONS, LLC, Santa Clara, CA (US)

(72) Inventors: Yujie Zhu, Mississauga (CA); Yulin Wang, Oakville (CA); Robert Claridge, Cambridge (CA); Kurt I. Halfyard, Mississauga (CA)

(73) Assignee: GENESEE VALLEY INNOVATIONS, LLC, Santa Clara, CA (US)

( * ) Notice: Subject to any disclaimer, the term of this patent is extended or adjusted under 35 U.S.C. 154(b) by 95 days.

(21) Appl. No.: 17/810,953

(22) Filed: Jul. 6, 2022

(65) Prior Publication Data

US 2024/0011171 A1     Jan. 11, 2024

(51) Int. Cl.
| | |
|---|---|
| *C25B 11/081* | (2021.01) |
| *B82Y 40/00* | (2011.01) |
| *C09D 5/24* | (2006.01) |
| *C09D 11/033* | (2014.01) |
| *C09D 11/037* | (2014.01) |
| *C25B 1/23* | (2021.01) |
| *C25B 9/19* | (2021.01) |
| *C25B 11/032* | (2021.01) |
| *C25B 11/054* | (2021.01) |

(Continued)

(52) U.S. Cl.
CPC .............. *C25B 11/081* (2021.01); *C09D 5/24* (2013.01); *C09D 11/033* (2013.01); *C09D 11/037* (2013.01); *C25B 1/23* (2021.01); *C25B 9/19* (2021.01); *C25B 11/032* (2021.01); *C25B 11/054* (2021.01); *C25B 13/00* (2013.01); *B82Y 30/00* (2013.01); *B82Y 40/00* (2013.01)

(58) Field of Classification Search
CPC ... C25B 11/081; C25B 11/032; C25B 11/054; C25B 1/23; C25B 9/19; C25B 13/00; C23C 24/00; C23C 24/08; C23C 24/082; C23C 26/00; C09D 11/033; C09D 11/037; C09D 11/03; C09D 11/10
See application file for complete search history.

(56) References Cited

U.S. PATENT DOCUMENTS

| | | | |
|---|---|---|---|
| 8,158,032 B2 | 4/2012 | Liu et al. | |
| 8,324,294 B2 | 12/2012 | Wu et al. | |
| 10,333,166 B2 * | 6/2019 | Takahashi ............... | H01M 4/86 |

(Continued)

OTHER PUBLICATIONS

Wang et al; Carbon supported Ag nanoparticles with different particle size as cathode catalyst for anion exchange membrane direct glycerol fuel cell; Renewable Energy 62 pp. 556-562; Sep. 11, 2013. (Year: 2013).*

*Primary Examiner* — Michael P Wieczorek

(74) *Attorney, Agent, or Firm* — MH2 Technology Law Group LLP

(57) ABSTRACT

A composition, a gas diffusion electrode, and a method for fabricating the same is disclosed. In an example, the composition includes carbon supported nitrogen surface functionalized silver nanoparticles. The gas diffusion electrode can be fabricated with the carbon supported nitrogen surface functionalized silver nanoparticles and deployed in a membrane electrode assembly for various applications.

5 Claims, 10 Drawing Sheets

(51) Int. Cl.
    *C25B 13/00*          (2006.01)
    *B82Y 30/00*          (2011.01)

(56)               References Cited

U.S. PATENT DOCUMENTS

| | | | |
|---|---|---|---|
| 2007/0099069 A1* | 5/2007 | Min | H01M 4/92 |
| | | | 429/535 |
| 2011/0305821 A1* | 12/2011 | Wu | C09D 11/322 |
| | | | 252/519.2 |
| 2021/0172079 A1* | 6/2021 | Martic | C25B 11/04 |
| 2021/0207275 A1* | 7/2021 | Huo | C25B 1/23 |
| 2024/0010850 A1* | 1/2024 | Zhu | C25B 11/095 |

\* cited by examiner

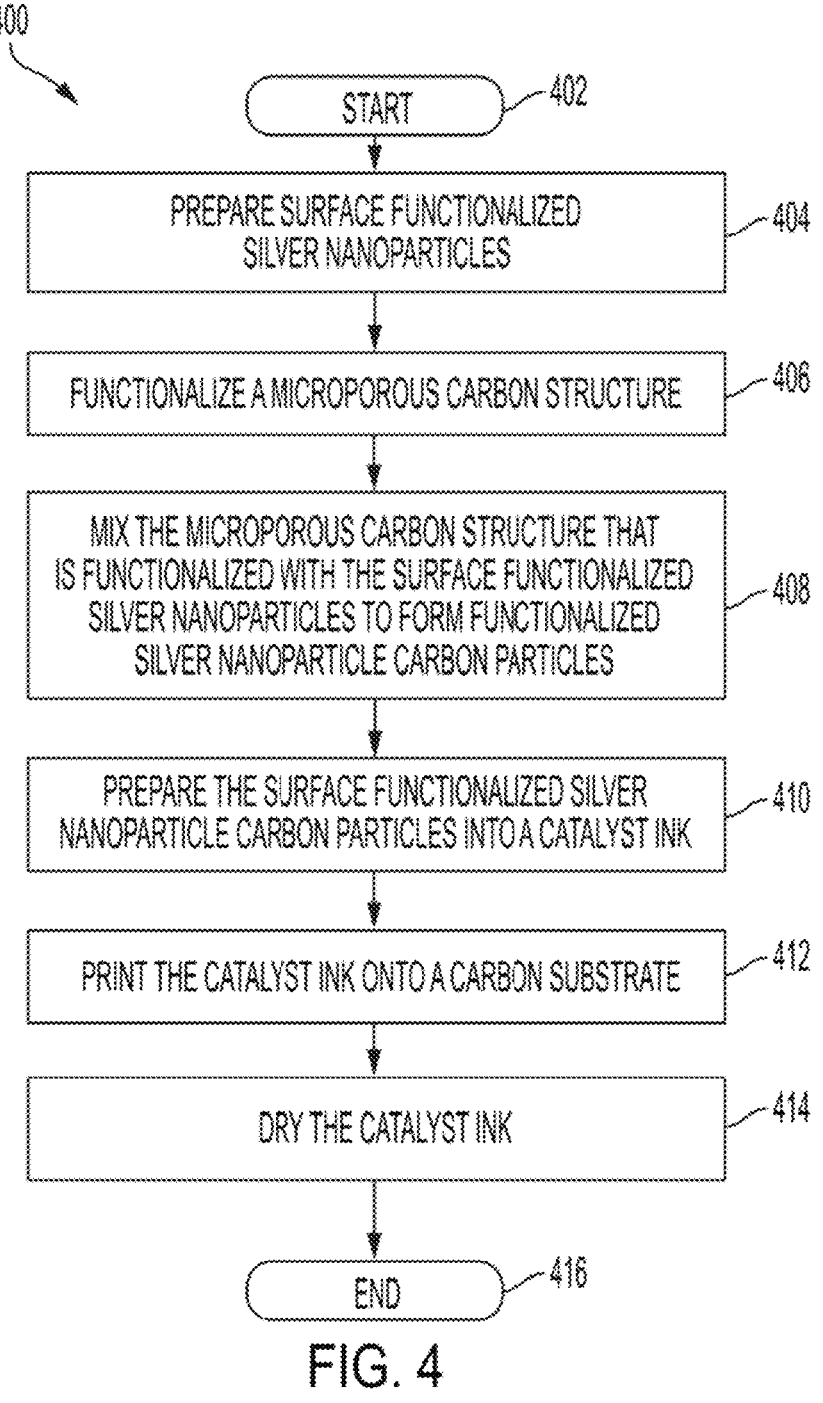

400

402 — START

404 — PREPARE SURFACE FUNCTIONALIZED SILVER NANOPARTICLES

406 — FUNCTIONALIZE A MICROPOROUS CARBON STRUCTURE

408 — MIX THE MICROPOROUS CARBON STRUCTURE THAT IS FUNCTIONALIZED WITH THE SURFACE FUNCTIONALIZED SILVER NANOPARTICLES TO FORM FUNCTIONALIZED SILVER NANOPARTICLE CARBON PARTICLES

410 — PREPARE THE SURFACE FUNCTIONALIZED SILVER NANOPARTICLE CARBON PARTICLES INTO A CATALYST INK

412 — PRINT THE CATALYST INK ONTO A CARBON SUBSTRATE

414 — DRY THE CATALYST INK

416 — END

FIG. 4

CARBON SUPPORTED NITROGEN SURFACE FUNCTIONALIZED SILVER NANOPARTICLES FOR GAS DIFFUSION ELECTRODES

The present disclosure relates generally to membrane electrode assemblies and relates more particularly to gas diffusion electrodes with carbon surface functionalized silver nanoparticles used in various conversion systems.

BACKGROUND

The emission of greenhouse gases (GHGs) like $CO_2$ is causing depletion of the earth's ozone layer and the global temperature increase, leading to adverse effects on human health, agriculture, and water resources. To mitigate global climate change, worldwide interest has been focused on the field of $CO_2$ capture and utilization (CCU), where electro-catalytic conversion of $CO_2$ into value-added chemicals and synthetic fuels is one of the attractive approaches. With appropriate electro-catalysts and reaction conditions including overpotential, reaction temperature, and electrolyte, etc., $CO_2$ can be electrochemically converted into various products such as carbon monoxide (CO), methane ($CH_4$), ethylene ($C_2H_4$), formic acid (HCOOH), methanol ($CH_3OH$) and ethanol ($C_2H_5OH$), etc.

At the current stage, electrochemical conversion of $CO_2$ into CO is one of the most promising reactions, due to its high technological and economic feasibility. In this reaction, syngas (CO and $H_2$) can be generated in an energy-efficient way and then used as feedstocks to produce synthetic hydrocarbons via a Fischer-Tropsch synthesis process.

SUMMARY

According to aspects illustrated herein, there is provided a composition, a membrane electrode assembly and a method for fabricating a gas diffusion electrode for the membrane electrode assembly. One disclosed feature of the embodiments is a composition comprising a carbon supported nitrogen surface functionalized silver nanoparticle.

Another disclosed feature of the embodiments is a method comprising preparing an ink comprising carbon supported silver nanoparticles and depositing the ink on an electrically conductive surface.

Another disclosed feature of the embodiments is an electrode. The electrode comprises an electrically conductive surface and carbon supported surface functionalized silver nanoparticles on the electrically conductive surface.

BRIEF DESCRIPTION OF THE DRAWINGS

The teaching of the present disclosure can be readily understood by considering the following detailed description in conjunction with the accompanying drawings, in which:

FIG. 4 illustrates a flowchart of another example method for fabricating a gas diffusion electrode of the present disclosure;

To facilitate understanding, identical reference numerals have been used, where possible, to designate identical elements that are common to the figures.

DETAILED DESCRIPTION

Figure 1:
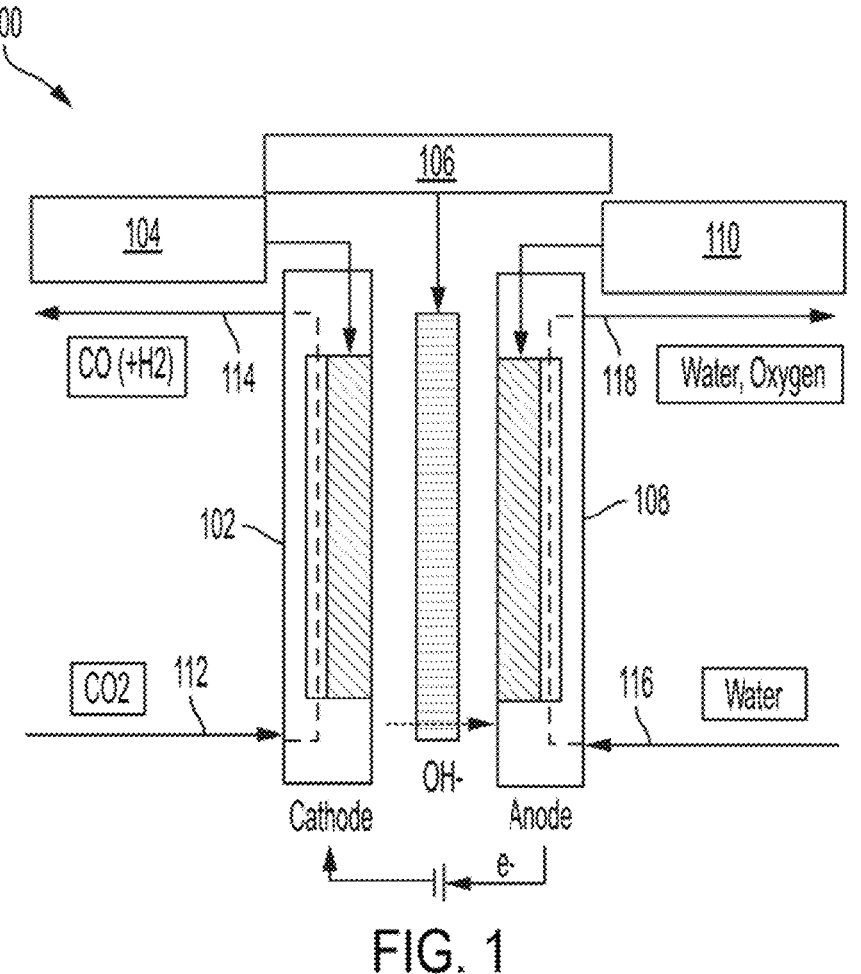
FIG. 1 illustrates an exploded block diagram of an example membrane electrode assembly with a gas diffusion electrode of the present disclosure.

The present disclosure broadly discloses an example gas diffusion electrode with microporous carbon structures impregnated via an ex-situ process with organo-functionalized silver nanoparticles and a method for fabricating the same. As discussed above, there is worldwide interest in CCU using electro-catalytic conversion of $CO_2$ into value-added chemicals and synthetic fuels.

The key to the electrochemical conversion process is the electro-catalysts with high efficiency and selectivity, as well as long-term stability. Recent years have witnessed significant advances in the development of electro-catalysts that can selectively reduce $CO_2$ to CO, including Au, Ag, Zn, Pd, and Ga, etc. Among all the candidates, silver shows the highest potential for large-scale applications, owning to its moderate cost and high catalytic selectivity for CO production. Despite the extensive study on Ag-based electro-catalysts, challenges remain in developing materials with enhanced catalytic selectivity at reduced overpotentials, in a simple, scalable, and cost-efficient way.

The present disclosure uses carbon supported nitrogen surface functionalized silver nanoparticles that are formed by depositing nitrogen surface functionalized silver nanoparticles formed ex-situ onto a surface of a carbon support or structure. For example, the silver nanoparticles may be surface functionalized in isolation away from the carbon structure before being added onto the surface of the carbon structure. In other words, the fully synthesized silver nanoparticles are removed from the liquid-containing composition that the surface functionalized silver nanoparticles were formed in and then added to the carbon structure. In some embodiments, the carbon structure may be microporous or non-porous. The microporous carbon structure may be impregnated with surface functionalized silver nanoparticles that are formed ex-situ as the electro-catalysts in the gas diffusion electrode for electro-catalytic conversion of $CO_2$. The carbon supported surface functionalized silver nanoparticles may be formed ex-situ via an impregnation method.

"Carbon supported" may be defined as the surface functionalized silver nanoparticles being on the surface of the carbon structure. The carbon structure may be larger than the surface functionalized silver nanoparticles. For example, the carbon structure can be from about 50 nanometers (nm) to about 100 nm in diameter) versus the surface functionalized silver nanoparticles that can be from about 5 nm to about 20 nm in diameter. Thus, the smaller silver nanoparticles can be formed onto the surface of the carbon structure.

Nanostructured silver catalysts have shown improved performance compared to their bulk counterparts, as they offer mass-transport advantages and more highly active sites on the edges and corners of the nanomaterials. By tuning nanomaterial composition, size, morphology, porosity, and surface modification, nanostructured catalyst behaviors can be adjusted for specific applications.

Surface modification is one of the effective approaches to improve catalytic performance. Studies have suggested that functional molecules can decrease the overpotential or improve CO selectivity, e.g., amine-capped Ag nanoparticles show better catalytic performance through stabilizing the COOH* intermediate.

Integration of such electro-catalysts into the Membrane Electrode Assembly (MEA) is another key step to obtain desirable products. A typical MEA comprises two gas diffusion layers (GDLs) and an ion exchange membrane with catalyst particles dispersed at the interface, and its production is similar to the various roll-to-roll production methods utilized in printing. Despite the great effort in developing MEAs for CO2 conversion systems, it remains challenging to fabricate MEAs with low cost, high standard performance, and tunable properties.

The present disclosure provides novel carbon supported nitrogen surface functionalized silver nanoparticles and a scalable approach to prepare MEAs for electrochemical reduction using the carbon supported nitrogen surface functionalized silver nanoparticles as electro-catalysts that are efficient and selective. Although the carbon structure can be non-porous, microporous carbon structures provide improved performance for MEAs. Microporous carbon structures impregnated with surface functionalized silver nanoparticles are synthesized and formulated into catalyst inks which are deposited on GDLs via continuous print/coating methods. The surface functionalized silver nanoparticle carbon particles may reduce the silver loading by up to 20 times compared to the amount of silver loading for unsupported silver nanoparticles. The fabrication of MEAs with high Faradic efficiency and selectivity for CO are demonstrated under relatively low overpotentials.

FIG. 1 illustrates an example membrane electrode assembly 100 that includes a gas diffusion electrode 104 of the present disclosure. The membrane electrode assembly 100 may be part of a flow cell electro-catalytic converter that is used to convert a compound into different desirable compounds. The gas diffusion electrode 104 of the present disclosure may provide a scalable electrode that is highly efficient at lower cell potentials (e.g., uses less power to perform the conversion).

One example conversion that can be performed by the membrane electrode assembly 100 is the conversion of carbon dioxide ($CO_2$) into carbon monoxide (CO) and hydrogen gas ($H_2$). However, it should be noted that the gas diffusion electrode 104 may be used for electro-catalytic conversion of other types of compounds within the context of flow cell electro-catalytic converters.

In one embodiment, the membrane electrode assembly 100 includes a cathode 102 having the gas diffusion electrode 104, an anion exchange membrane 106, and an anode 108 with an iridium-oxide electrode 110. In one embodiment, an inlet 112 may feed $CO_2$ through the cathode 104 and an outlet 114 may carry the CO and $H_2$ away from the cathode 104. An inlet 116 may feed water through the anode 110 and an outlet may carry water and oxygen away from the anode 108.

In one embodiment, a reference voltage 114 may be applied to assist in the conversion of the $CO_2$ into CO and $H_2$. For example a cell potential may be applied to the membrane electrode assembly 100 via the reference voltage to perform the electro-catalytic conversion. The examples discussed herein applied a cell potential or overpotential of 2.80 Volts (V) to 3.80 (V).

In one embodiment, the gas diffusion electrode 104 may be fabricated with microporous carbon structures impregnated with surface functionalized silver nanoparticles, as described herein. Details of the methods to fabricate the gas diffusion electrode 104 are discussed in further details below. The gas diffusion electrode 104 may be fabricated by coating a carbon substrate with a catalyst ink formulated with surface functionalized silver nanoparticle carbon particles and then drying the catalyst ink.

In one embodiment, the gas diffusion electrode 104 of the present disclosure may have a Faradic efficiency that is greater than 60% with a selectivity that is greater than 98% at overpotentials or a cell potential less than 3.50 V. The gas diffusion electrode 104 may have a single pass conversion rate of $CO_2$ to CO of greater than 25% at a cell potential less than 3.50V. The gas diffusion electrode 104 may have a current density of greater than 75 milliamps per square centimeter ($mA/cm^2$) at a cell potential between 3.00 V to 3.50 V. The gas diffusion electrode 104 may have an energetic efficiency of greater than 25% at a cell potential of 3.00 V. A comparison of the various performance parameters of the gas diffusion electrode 104 with and without impregnated microporous carbon structures is illustrated in FIGS. 5-10 and discussed in further detail below with reference to examples provided herein.

In one embodiment, the ion exchange member 106 may be a Dioxide Materials Sustainion X37-50-RT activated with potassium hydroxide (KOH) and rinsed with deionized water. The anode 110 may be an iridium oxide ($IrO_2$) coated carbon substrate with the catalyst facing up or towards the ion exchange member 106.

In one embodiment, the anolyte may be potassium bicarbonate ($KHCO_3$). The catholyte flow chamber may capture the CO and $H_2$ converted from the $CO_2$ provided by the carbon dioxide flow chamber 102. As noted above, the membrane electrode assembly may be used in a flow cell electro-catalytic converter system. Although various examples are were provided for the anolyte, the anode 110, and the ion exchange membrane 106, it should be noted that other materials may be deployed.

Figure 2:
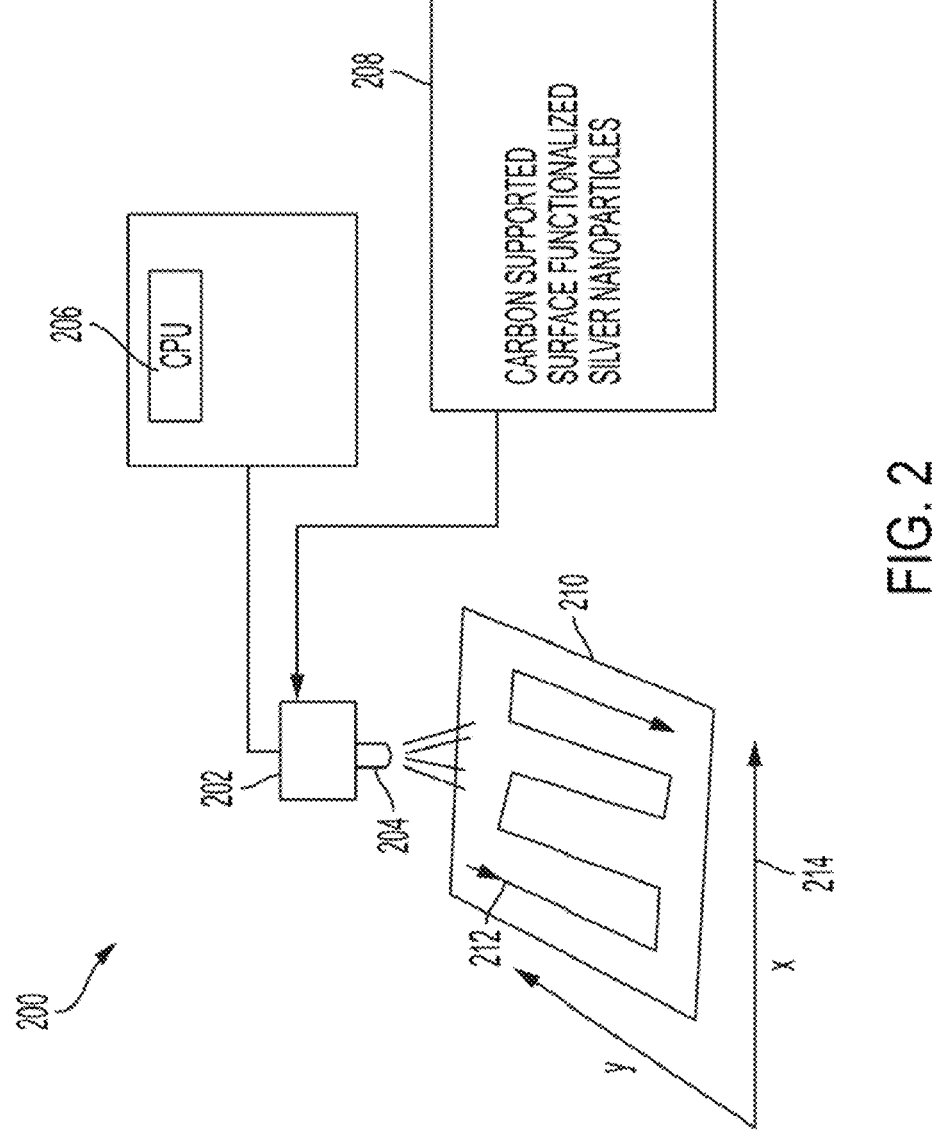
FIG. 2 illustrates a block diagram of an example printer used to spray surface functionalized silver nanoparticle carbon particles onto a carbon substrate to fabricate the gas diffusion electrode of the present disclosure.

FIG. 2 illustrates a block diagram of an example printer 200 that can be used to spray carbon supported surface functionalized silver nanoparticles 208 that are prepared for fabrication of the gas diffusion electrode 104.

In one embodiment, the carbon supported surface functionalized silver nanoparticles 208 may be prepared by mixing silver acetate with nitrogen containing moieties. For example, a compound having nitrogen molecules can attach to the surface of the silver particles.

In one embodiment, the nitrogen containing moiety may include an amine, an amide, an imide, or a nitrogen containing aromatic compound. The amine may be a primary amine, a secondary amine, or a tertiary amine. Examples of primary amines may include hexylamine, heptylamine, octylamine, nonylamine, decylamine, undecylamine, dodecylamine, and the like. Examples of secondary amines may include piperidine, pyrrolidine, dipropylamine, dibutylamine, dipentylamine, dihexylamine, diheptylamine, dioctylamine, dinonylamine, didecylamine, diisopropylamine, and the like. Examples of tertiary amines may include diisopropylethylamine, triethylamine, diethylmethylamine, tripropylamine, tributylamine, tripentylamine, trihexylamine, triheptylamine, trioctylamine, trinonylamine, tridecylamine triundecylamine, tridodecylamine, and the like.

Example amides may include propanoamide, butanoamide, pentanoamide, hexanoamide, benzamide, N-methylbutanamide, N-ethylbutanamide, glutamine, asparagine, and the like. Example imides may include succinimide, maleimide, glutarimide, phthalimide, and the like. Example nitrogen containing aromatic compounds may include pyridine, 4-methylpyridine, 4-ethylpyridine, 4-propylpyridine, pyrrole, imidazole, 4-methylimidazole, and the like.

In one embodiment, functionalizing the silver nanoparticles may refer to changing nanomaterial properties to add certain functionality through assembling different nitrogen containing materials via covalent or noncovalent bonds, such as hydrogen bonds, electrostatic force, van der Waals force, and the like.

In one embodiment, the carbon supported surface functionalized silver nanoparticles 208 may be prepared with dodecylamine. Thus, the silver nanoparticles can be functionalized to bond with a carbon substrate by attaching dodecylamine to the silver nanoparticles through noncovalent bonds. For example, the nitrogen molecule can be coordinated to the silver molecules to form the noncovalent bonds. Example 1 below describes an example of the carbon supported surface functionalized silver nanoparticles 208 with dodecylamine.

Example 1

Melted dodecylamine (222.39 grams (g), 1.1997 mol) was added to a 1 liter (L), 3 necked round bottom flask, fitted with an overhead stirring system, thermometer, and Argon (Ar) line. The reaction flask was immersed in a 35 degree Celsius (° C.) water bath and stirring set to 300 rotations per minute (RPM). 15 milliliters (mL) of methanol was added to the flask followed by 75 mL decalin. Phenylhydrazine (16.2 g, 0.1498 mol) was then added with stirring and the temperature was stabilized at 35° C. Silver acetate powder (50 g, mol) was slowly added to the mixture, keeping the reaction temperature between 35-37° C. Stirring slowly ramped to 500 RPM over silver acetate addition. Once the entirety of silver acetate was added, the reaction was brought to 40° C. and stirred for 1 hour.

After 1 hour, 375 mL of methanol was added and stirred for 10 minutes. Precipitate was filtered on a Buchner funnel with 2 filter media added (Whatman 934AH glass fiber paper on bottom, Whatman #54 filter paper on top). Filtration afforded a blue wetcake which was reslurried in 125 mL methanol for 10 minutes and filtered. The wash was repeated one additional time and dried under vacuum for 10 minutes to give bluish-grey silver nanoparticle (AgNP) wetcake (33.75 g).

The AgNP wetcake was placed in a vacuum oven at room temperature with vacuum set to −30 inches of mercury (In Hg). Material was removed when all the methanol was removed to give 29 g of bluish-grey AgNP powder. Particle size by Electrophoretic Light Scattering (ELS) was measured to be higher, Zave: 48.3 nanometers (nm), Zave (primary distribution): 12.2 nm, D(1,0): 9.1 nm.

The carbon supported surface functionalized silver nanoparticles were then used to impregnate microporous carbon structures as described by Example 2 below.

Example 2

105 milligrams (mg) of Vulcan XC-72R carbon black (Cabot) was dispersed in hexane by sonication, and then, the carbon black was impregnated overnight with 70 mg of AgNP-DDA particles (AC1538) dispersed in toluene. After filtration, washing and overnight vacuum drying, the product marked as AgNP-DDA/C catalyst was obtained.

In another example, the surface functionalized silver nanoparticles were used to impregnate microporous carbon structures that are acid treated. An example of the acid treating the microporous carbon structures is described in Example 3 below.

Example 3

300 mg carbon black Vulcan XC-72R (Cabot) was functionalized with 20% nitric acid ($HNO_3$) at 120° C., refluxed for 2 hours. After that, the functionalized carbon was filtered and washed with deionized (DI) water until filtrate neutralization was reached, followed by drying at 110° C. overnight.

105 mg functionalized Vulcan XC-72R carbon black was dispersed in hexane by sonication, and then, the carbon black was impregnated overnight with 70 mg of Ag-DDA particles (AC1538) dispersed in toluene. After filtration, washing and overnight vacuum drying, the product marked as 40 wt % Ag-DDA/C catalyst was obtained.

The carbon supported surface functionalized silver nanoparticles 208 (with or without acid treatment) may then be prepared into an ink form that can be dispensed by a printhead 202 with a spray nozzle 204 that is under the control of a central processing unit (CPU) 206 (also referred to as a processor or controller). The in-situ synthesized carbon supported surface functionalized silver nanoparticles 208 may be mixed with a polar or non-polar solvent to prepare the ink. Examples of the polar solvent may include ethanol, isopropanol, butanol, water, and the like. Examples of the non-polar solvent may include toluene, decalin, benzene, hexane, and the like. In one embodiment, several polar solvents, several non-polar solvents, or a combination of both polar solvents and non-polar solvents may be used to prepare the ink. For example, the solvent can be water and isopropyl alcohol, with a ratio from 90:10 to 10:90. In another example, the solvent may be pure isopropyl alcohol. The solid concentration of the surface functionalized silver nanoparticles 208 may range from 0.1 wt % to 5 wt %.

The printhead 202 may move along an x-y coordinate system 214 to distribute the carbon supported surface functionalized silver nanoparticles 208 across the surface of the substrate 210. Example 4 describes an example of how the carbon supported surface functionalized silver nanoparticles 208 (with or without acid treatment) are prepared into an ink form.

Example 4

The cathode catalyst ink was prepared by mixing 150 mg of the above 40 wt % AgNP-DDA/C powder with 18.07 ml of toluene, 1.29 g of 2.5 wt % Sustainion XA-9/toluene dispersion. The ink was ultra-sonicated for 60 min for complete mixing.

The carbon supported surface functionalized silver nanoparticles 208 in an ink form may then be printed onto a substrate 210. The substrate 210 may be a carbon substrate. The carbon supported surface functionalized silver nanoparticles 208 may be printed by spraying the substrate 210 with the carbon supported surface functionalized silver nanoparticles 208 in an ink form.

In one example, the carbon supported surface functionalized silver nanoparticles 208 in an ink form were spray coated with an ultrasonic spray coater with nitrogen flow gas at 34 kilopascals (kPa) at 0.17 cubic meters (m 3) delivery per hour at a stand-off distance of 30 millimeters (mm) from a sonic head gas diffusion layer substrate. Sonication power was at 1.5 watts (W) and a conical vortex delivery pattern with 0.3 milliliters per minute (mL/min) ink delivery via a syringe pump. Printing was done via an X-Y ballscrew-stage with fixed Ultrasonic (e.g., Sonotek-Vortex) print head was 60 mm×60 mm zone consisting of a serpentine path of 12 lines with a 5 mm spacing gap between them at a linear speed of 25 mm per second (mm/sec). The ink was stirred using a string bar in the syringe.

After the carbon supported surface functionalized silver nanoparticles 208 are prepared in an ink form and printed onto the substrate 210, the carbon supported surface functionalized silver nanoparticles 208 on the substrate 210 may be dried at room temperature for 24 hours.

In an example, two different gas diffusion electrodes 104 were prepared. A first electrode received 15 passes of the carbon supported surface functionalized silver nanoparticles 208 without acid treated carbon. A second electrode received 15 passes of the carbon supported surface functionalized silver nanoparticles 208 with acid treated carbon. FIGS. 5-10 illustrate image comparisons of the different fabricated electrodes with and the comparative performance of each electrode compared to gas diffusion electrodes fabricated with surface functionalized silver nanoparticles without using the carbon impregnation described above.

Figure 5:
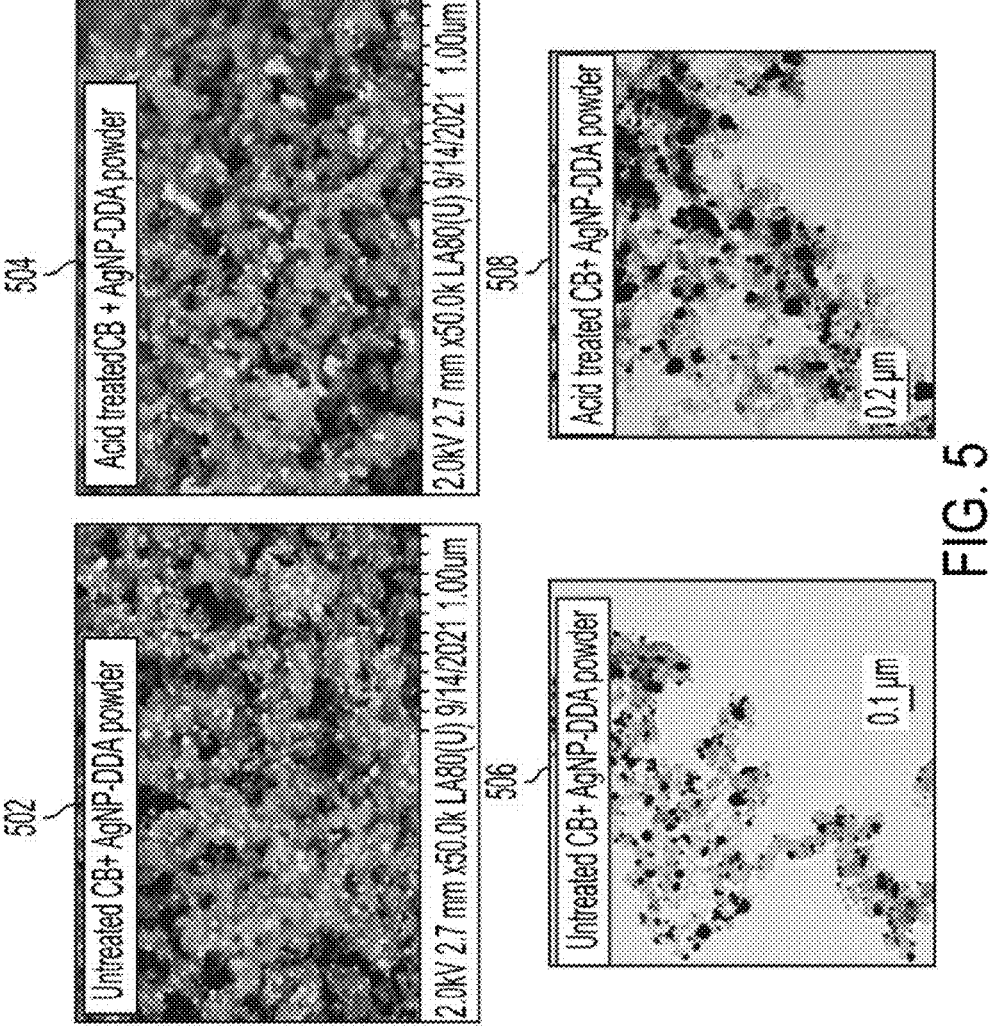
FIG. 5 illustrates SEM and TEM images of both functionalized and non-functionalized microporous carbon structures impregnated with organo-functionalized silver nanoparticles.

FIG. 5 illustrates scanning electron microscope (SEM) and transmission electron microscopy (TEM) images of different types of electrodes. For example, SEM image 502 illustrates a gas diffusion electrode with microporous carbon structures that are not acid treated and impregnated with surface functionalized silver nanoparticles. SEM image 504 illustrates a gas diffusion electrode with microporous carbon structures that are treated with acid and impregnated with surface functionalized silver nanoparticles. The SEM images 502 and 504 appear to show a uniform distribution of the surface functionalized silver nanoparticles on the microporous carbon support structures. However, the surface functionalized silver nanoparticles appear to aggregate more microporous carbon support structures that receive the acid treatment (e.g., the SEM image 504) compared to the microporous carbon support structures that do not receive the acid treatment (e.g., the SEM image 502). These observations are further confirmed by TEM image 506 of the microporous carbon structures that are not acid treated and impregnated with surface functionalized silver nanoparticles and TEM image 508 of the microporous carbon structures that are treated with acid and impregnated with surface functionalized silver nanoparticles.

Figure 6:
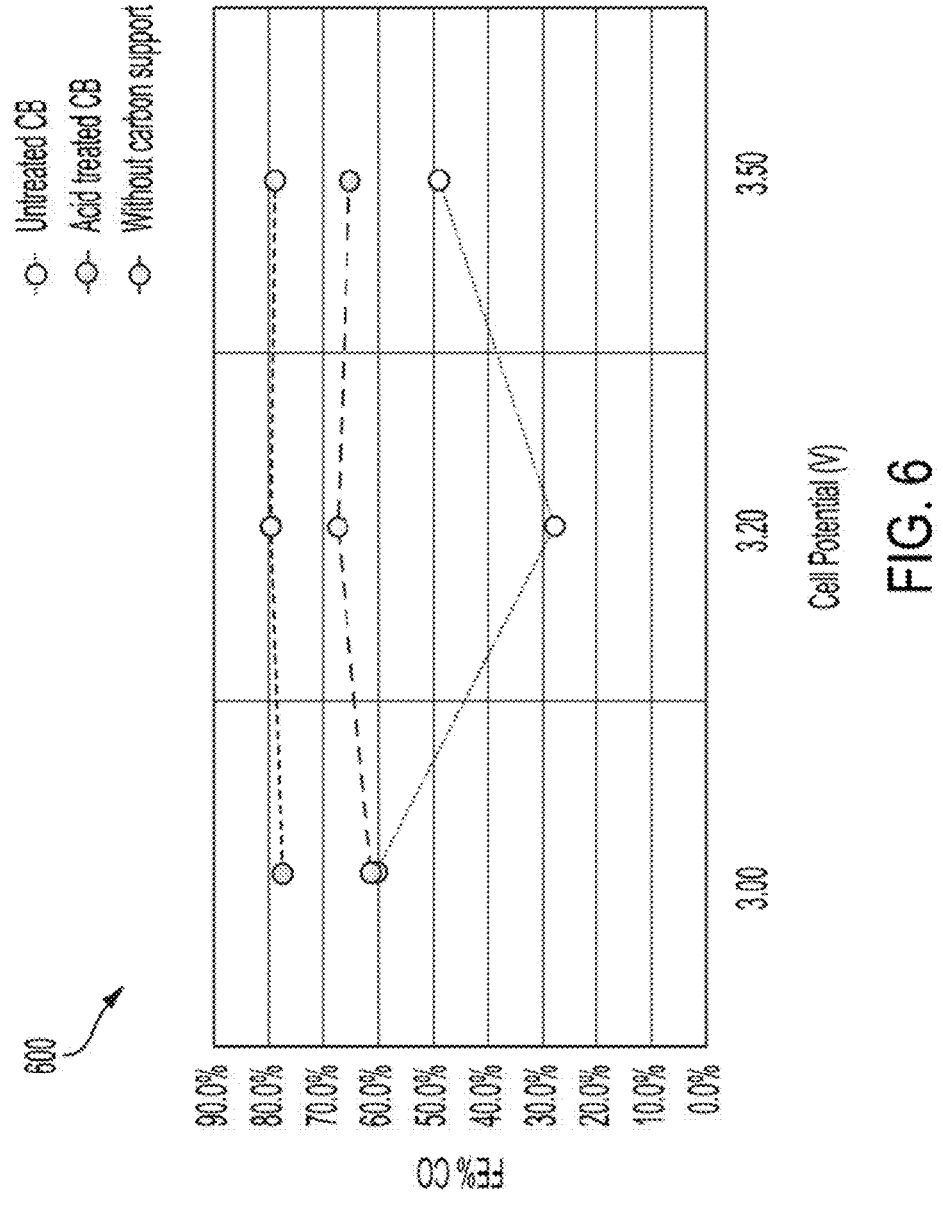
FIG. 6 illustrates a graph of Faradaic efficiency versus cell potential for various microporous carbon structures.

FIG. 6 illustrates a graph 600 of the Faradic efficiency versus cell potential for the two example electrodes described above compared to an electrode without the microporous carbon support structure. As noted above, the silver loading of the electrode without the microporous carbon support structure is much higher (e.g., approximately 1.6 mg/cm$^2$) compared to the two electrodes with the microporous carbon support structure (e.g., less than 0.1 mg/cm$^2$ or approximately 0.08 mg/cm$^2$).

The Faradic efficiency is a measure of the specific electron efficiency participating in the desired electrochemical reaction. As shown in the graph 600 the Faradic selectivity towards carbon monoxide for the electrodes with the microporous carbon structure (treated and untreated) were found to be similar, but slightly below, the electrode without the microporous carbon structure through testing in a voltage region between 2.8 V to 3.8 V. The electrode with the acid treated microporous carbon structure showed a similar trend line as the electrode without the microporous carbon structure through the voltage region between 2.8 V to 3.8 V. However, all electrodes showed a Faradic efficiency greater than 60%.

Figure 7:
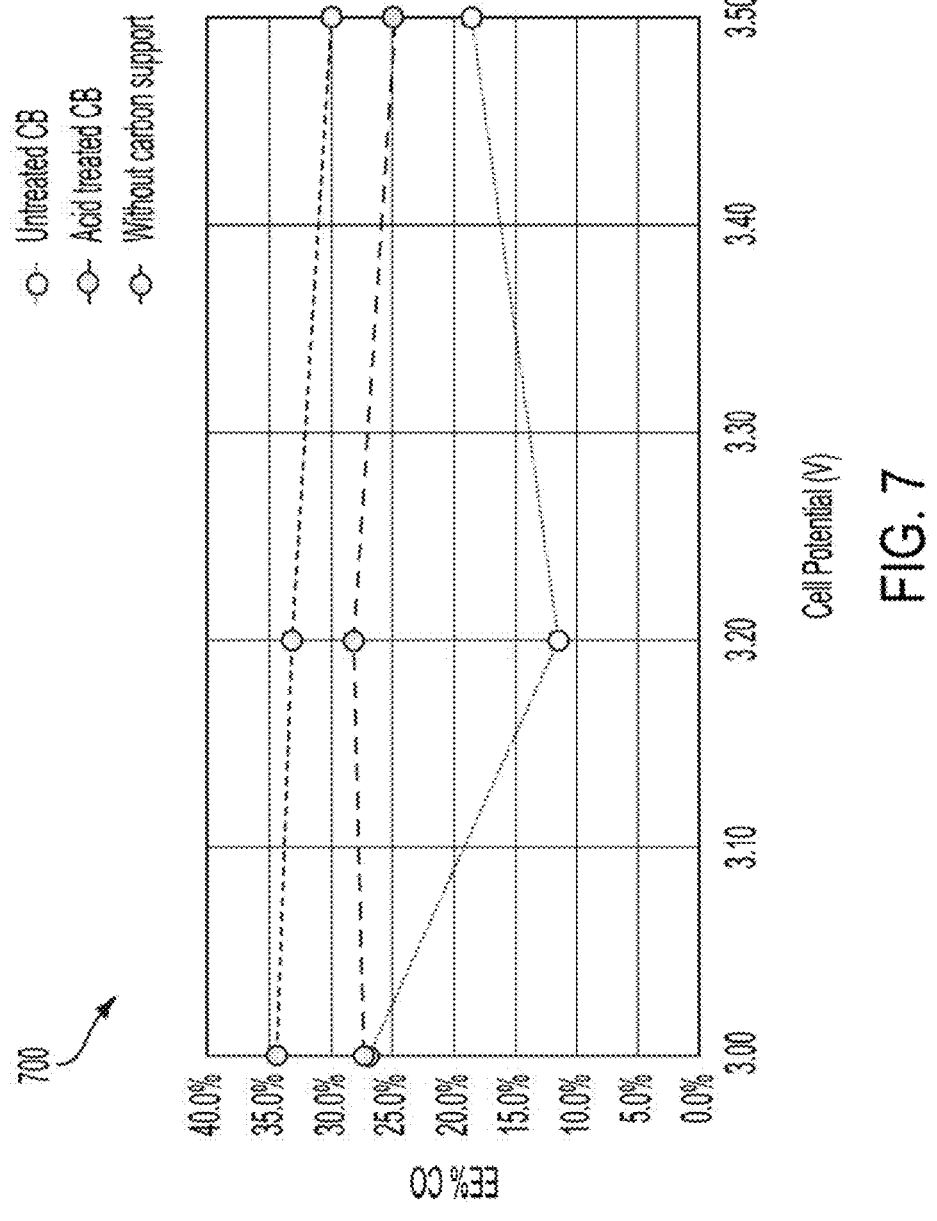
FIG. 7 illustrates energetic efficiency versus cell potential for various microporous carbon structures.

FIG. 7 illustrates a graph 700 of the energetic efficiency versus cell potential for the four example electrodes described above at different sintered conditions. The energetic efficiency is a measure of the true energy efficiency of the electrochemical conversion process. This is done by the multiplication of the Faradaic efficiency with cell overpotential, which yields the actual energy input.

The graph 700 illustrates that the energetic efficiency of the electrodes with the microporous carbon structure (treated and untreated) were found to be similar, but slightly below, the electrode without the microporous carbon structure through testing in a voltage region between 2.8 V to 3.8 V. The electrode with the acid treated microporous carbon structure showed a similar trend line as the electrode without the microporous carbon structure through the voltage region between 2.8 V to 3.8 V. All the electrodes showed an energetic efficiency of greater than 25% at the cell potential of 2.8 V.

Figure 8:
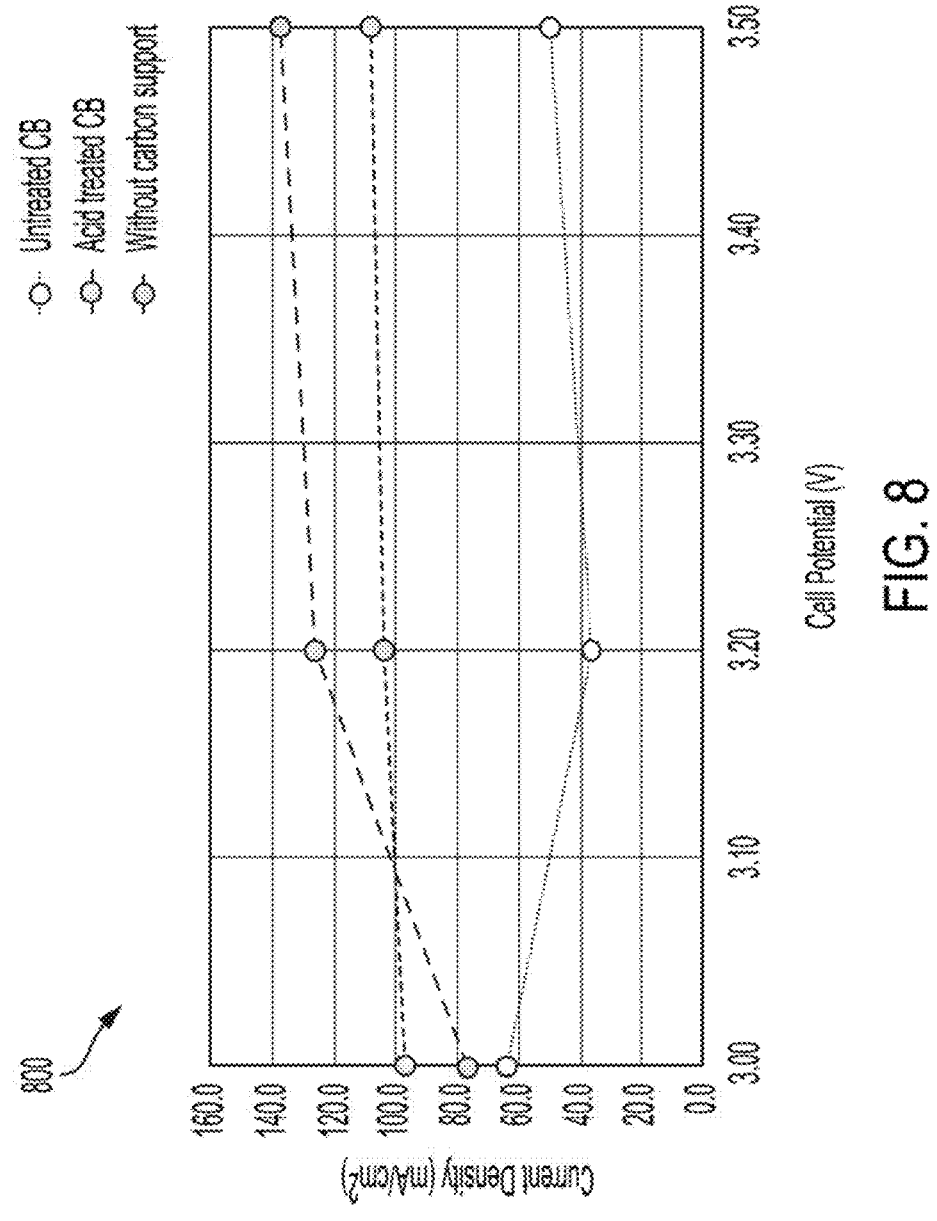
FIG. 8 illustrates current density versus cell potential for various microporous carbon structures.

FIG. 8 illustrates a graph 800 of the current density in mA/cm$^2$ versus cell potential for the four example electrodes described above at different sintered conditions. The current density is a measure of the amount of charge able to be applied to the cell and is directly related to the maximum throughput or conversion rate. This makes the current density a critical factor when considering the scale-up economics of CO$_2$ electrolysis.

The graph 800 illustrated that at 3.00 V the electrode without the microporous carbon structure had the highest current density, followed by the electrode with the acid treated microporous carbon structure, and then the electrode with the untreated microporous carbon structure. Graph 800 illustrates that the current density improves as the voltage increases for the electrode with the acid treated microporous carbon structure. The electrode with the untreated microporous carbon structure did not exhibit as good a performance as the electrode with the acid treated microporous carbon structure. All electrodes showed a current density of greater than 60 mA/cm$^2$ at a cell potential of 2.80 V.

Figure 9:
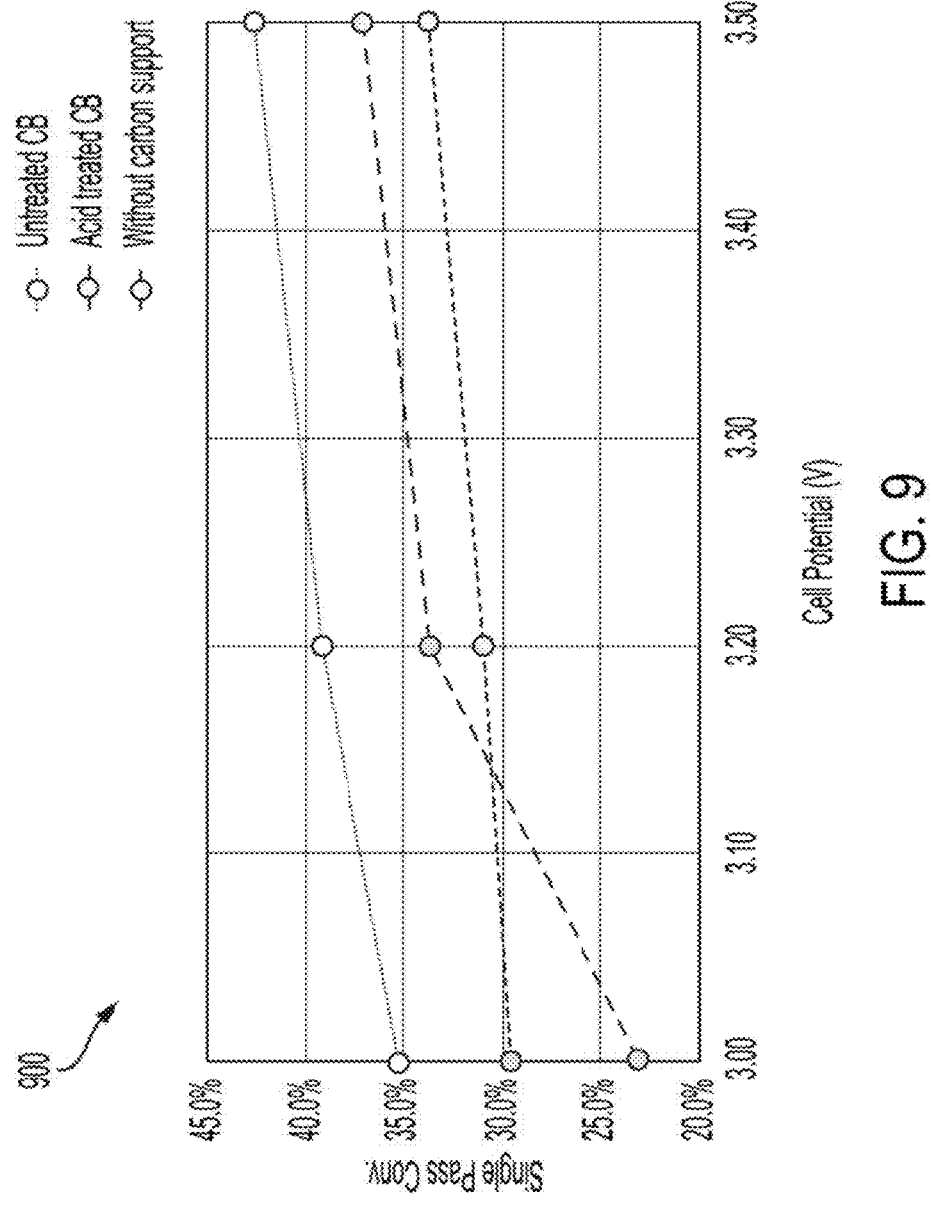
FIG. 9 illustrates single pass conversion rates versus cell potential for various microporous carbon structures.

FIG. 9 illustrates a graph 900 of the single pass conversion rate versus cell potential for the four example electrodes described above at different sintered conditions. The single pass conversion rate is a performance metric often related to scale-up economics of conversion systems. In this instance the outlet CO flow rate is measured and used to calculate the molar conversion percentage of the input CO$_2$.

The graph 900 illustrates that the electrode with the untreated microporous carbon structure had the highest single pass conversion rate, followed by the electrode without any microporous carbon structure, and then followed by the electrode with the acid treated microporous carbon structure. Graph 900 illustrates that the single pass conversion rate increases for all electrodes as the voltage is increased. All electrodes showed a single pass conversion rate of greater than 20% at cell potentials between 2.8 V to 3.8 V.

Figure 10:
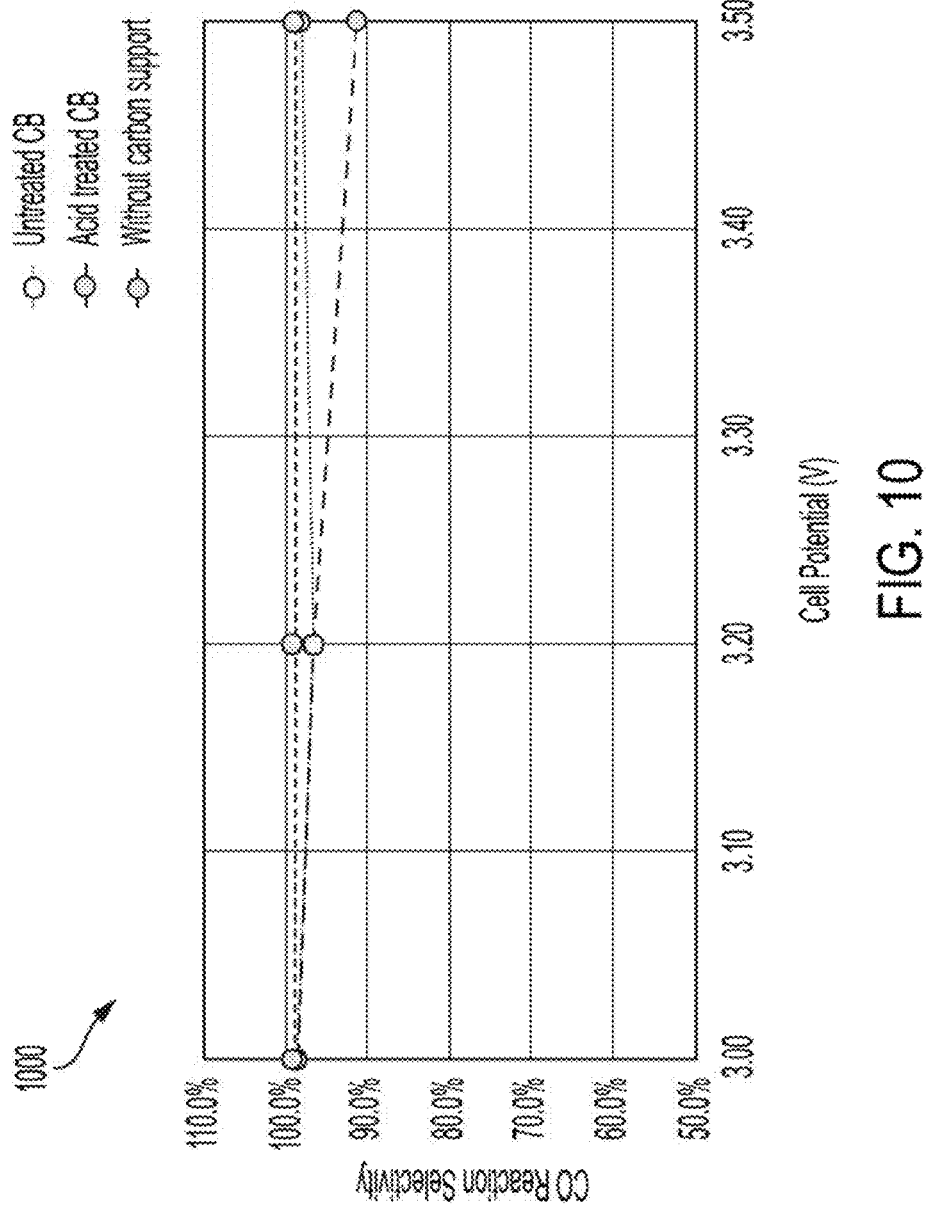
FIG. 10 illustrates carbon monoxide reaction selectivity versus cell potential for various microporous carbon structures.

FIG. 10 illustrates a graph 1000 of the CO reaction selectivity versus cell potential for the four example electrodes described above at different sintered conditions. The CO reaction selectivity is quantified by the molar ratio of CO to $H_2$ produced during cell operation. As indicated by the graph 1000, the CO selectivity is generally very high at lower potential ~2.8 V, reaching over 98% for all four devices. With the increase in applied voltage, there is a declining trend in selectivity for all electrodes, but all electrodes showed a very high and consistent CO reaction selectivity at lower voltages (e.g., 3.0 V and 3.2 V).

Based on an evaluation of the catalytic performance characteristics of the various electrodes, it was found that the electrodes with the microporous carbon structure (with or without acid treatment) can provide comparable target catalytic performance to the electrode without the impregnated microporous carbon structure. For example, electrodes with the carbon supported surface functionalized silver nanoparticles of the present disclosure can provide the same target catalytic performance level compared to another electrode having surface functionalized silver nanoparticles that are not carbon supported. In addition, the silver loading of the electrode is two times or more lower compared to another electrode having surface functionalized silver nanoparticles that are not carbons supported. The acid pre-treatment further improves the Faradic efficiency, energetic efficiency, and current density, making the catalyst system highly attractive for $CO_2$ reduction applications.

The more desirable catalytic behavior can be explained by the enhanced interaction between the silver and carbon support. To be more specific, strong acids, such as $HNO_3$, have been reported to activate carbon surfaces, and possibly forming —COOH groups on the carbon surface. Other methods may also be used to activate the carbon surfaces to increase interaction between the silver and the carbon support. For example, other treatments can include plasma treatment, bases, or other types of chemical treatments. Silver nanoparticles have strong interactions with the carboxylic acid and carbonyl groups present on the activated carbon surfaces, leading to better electron transfer properties and, thus, better catalytic performance.

Figure 3:
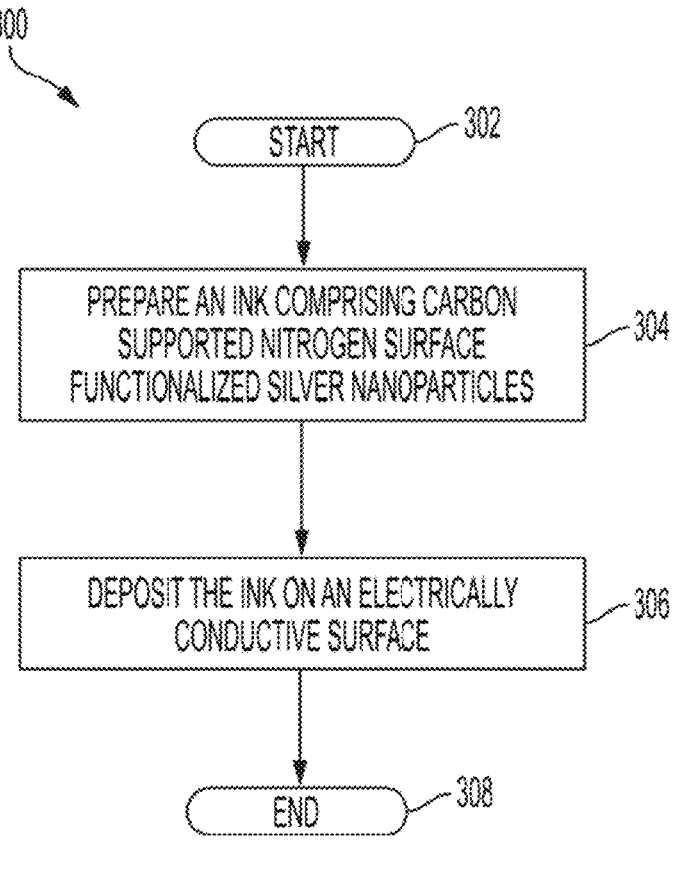
FIG. 3 illustrates a flowchart of an example method for fabricating a gas diffusion electrode of the present disclosure.

FIGS. 3 and 4 illustrate flowcharts of example methods 300 and 400, respectively, for fabricating a gas diffusion electrode of the present disclosure. In one embodiment, one or more blocks of the methods 300 and 400 may be performed by various tools or machines under the control of a central controller or processor (e.g., the printer 200) or in combination with manually performed steps to prepare the various compounds described herein.

Referring to method 300 in FIG. 3, at block 302, the method 300 begins. At block 304, the method 300 prepares an ink comprising carbon supported nitrogen surface functionalized silver nanoparticles. For example, the carbon supported nitrogen surface functionalized silver nanoparticles can be prepared by impregnating a microporous carbon structure with surface functionalized silver nanoparticles that are isolated away from the carbon structure during synthesis to form surface functionalized silver nanoparticle carbon particles.

In one embodiment, the silver nanoparticles may be nitrogen surface functionalized silver nanoparticles. In one embodiment, the nitrogen surface functionalized silver nanoparticles may be prepared by mixing silver acetate with a nitrogen containing moiety. In embodiments, the nitrogen containing moiety may include an amine, an amide, an imide, or a nitrogen containing aromatic compound, all of which are described within the present disclosure above.

In one embodiment, the nitrogen surface functionalized silver nanoparticles maybe prepared by mixing silver acetate with dodecylamine, as described above in Example 1.

In one embodiment, nitrogen surface functionalized nanoparticles may be deposited on a carbon structure. The carbon structure may be a porous or non-porous carbon structure. For microporous carbon structures, the microporous carbon structures may be impregnated with the nitrogen surface functionalized nanoparticles, as described by Example 2. In one embodiment, the microporous carbon structures may be functionalized with an acid before being impregnated with the nitrogen surface functionalized silver nanoparticles, as described by Example 3. The microporous carbon structures may include carbon black, carbon nanotubes, graphene, and the like.

The ink may then be prepared with the carbon supported nitrogen surface functionalized silver nanoparticles. In one embodiment, the microporous carbon structure impregnated with the nitrogen surface functionalized silver nanoparticles may be prepared as a catalyst ink that can be printed via a spray nozzle controlled by a printhead. For example, the catalyst ink can be sprayed onto the carbon substrate with the movable printhead. The catalyst ink can be formulated with toluene, as described above in Example 4.

At block 306, the method 300 deposits the ink on an electrically conductive surface. For example, the ink may be a catalyst ink. The catalyst ink can be sprayed or printed onto a carbon substrate. The catalyst ink can be printed in a serpentine pattern to evenly coat the substrate.

The catalyst ink may be dried to form a gas diffusion electrode. In one embodiment, the catalyst ink can be dried at room temperature for 24 hours to form the gas diffusion electrode. The gas diffusion electrode may be assembled as part of a membrane assembly electrode that is deployed in a flow cell electro-catalytic converter. The gas diffusion electrode may perform conversion of $CO_2$ into CO and $H_2$, as described above. At block 308, the method 300 ends.

Referring to the method 400 in FIG. 4, at block 402, the method 400 begins. At block 404, the method 400 prepares surface functionalized silver nanoparticles. In one embodiment, the surface functionalized silver nanoparticles may be prepared by mixing silver acetate with a mixture of phenyl hdrazine, methanol, decalin, and dodecylamine. The mixture of the silver acetate powder, phenyl hdrazine, methanol, decalin, and dodecylamine may be heated. Then, methanol may be added to precipitate the surface functionalized silver nanoparticles. Details of the preparation are described above in Example 1.

At block 406, the method 400 functionalizes a microporous carbon structure. For example, the microporous carbon structure may be functionalized by treating the microporous carbon structure with a strong acid, such as nitric acid. An example of functionalizing the microporous carbon structure is described above in Example 3.

At block 408, the method 400 mixes the microporous carbon structure that is functionalized with the surface functionalized silver nanoparticles to form surface functionalized silver nanoparticle carbon particles. Example 3, described above, provides an example of how the functionalized microporous carbon structure is mixed with the surface functionalized silver nanoparticles.

At block 410, the method 400 prepares the surface functionalized silver nanoparticle carbon particles into a catalyst ink. For example, the surface functionalized silver nanoparticle carbon particles may be mixed with toluene while stirring under a constant flow of argon. Details of preparing the catalyst ink with toluene are described above in Example 4.

At block 412, the method 400 prints the catalyst ink onto a carbon substrate. For example, the catalyst ink can be printed or sprayed onto the carbon substrate with nitrogen flow gas in a serpentine path via a spray nozzle controlled by a printhead.

At block 414, the method 400 dries the catalyst ink. For example, the catalyst ink can be dried at room temperature for 24 hours to finalize fabrication of the gas diffusion electrode. In one embodiment, the gas diffusion electrode may be assembled as part of a membrane assembly electrode that is deployed in a flow cell electro-catalytic converter. The gas diffusion electrode may perform conversion of $CO_2$ into $CO$ and $H_2$, as described above. At block 416, the method 400 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
preparing an ink comprising carbon supported nitrogen surface functionalized silver nanoparticles, wherein the preparing the ink comprises:
impregnating a microporous carbon structure with nitrogen surface functionalized silver nanoparticles formed in isolation from the microporous carbon structure to form the carbon supported nitrogen surface functionalized silver particles;
mixing the carbon supported nitrogen surface functionalized silver nanoparticles with a solvent; and
applying ultra-sonication to a mixture of the carbon supported nitrogen surface functionalized silver nanoparticles and the solvent; and
depositing the ink on an electrically conductive surface of a gas diffusion electrode; wherein:
a silver loading on the gas diffusion electrode after deposition is from about 0.08 $mg/cm^2$ to about 0.1 $mg/cm^2$; and
the carbon supported nitrogen surface functionalized silver nanoparticles exhibit a Faradic efficiency of greater than 60%.

2. The method of claim 1, wherein the carbon supported nitrogen surface functionalized silver nanoparticles comprise an acid treated carbon structure.

3. The method of claim 1, wherein the impregnating the microporous carbon structure with the nitrogen surface functionalized silver nanoparticles comprises:
dispersing the microporous carbon structure in hexane; and mixing the nitrogen surface functionalized silver nanoparticles dispersed in toluene with the microporous carbon structure dispersed in the hexane.

4. The method of claim 1, wherein the solvent comprises toluene.

5. The method of claim 1, wherein the depositing comprises:
spraying the ink onto the electrically conductive surface with a movable printhead.

* * * * *